United States Patent
Uwazumi et al.

(10) Patent No.: US 7,147,942 B2
(45) Date of Patent: Dec. 12, 2006

(54) PERPENDICULAR MAGNETIC RECORDING MEDIUM AND METHOD OF MANUFACTURING THE SAME AND PRODUCT THEREOF

(75) Inventors: Hiroyuki Uwazumi, Nagano (JP); Yasushi Sakai, Nagano (JP); Tadaaki Oikawa, Nagano (JP); Miyabi Nakamura, Ibaragi (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 10/314,907

(22) Filed: Dec. 9, 2002

(65) Prior Publication Data

US 2003/0157375 A1    Aug. 21, 2003

(30) Foreign Application Priority Data

Dec. 7, 2001    (JP)    ............................. 2001-374897

(51) Int. Cl.
   *G11B 5/66*    (2006.01)
   *G11B 5/70*    (2006.01)

(52) U.S. Cl. ................................. 428/831.2; 204/192.2

(58) Field of Classification Search .......... 428/694 TS, 428/694 T, 900, 694 TP, 831.2, 831
See application file for complete search history.

(56) References Cited

U.S. PATENT DOCUMENTS

| | | | |
|---|---|---|---|
| 4,722,869 A | 2/1988 | Honda et al. ................ 428/611 |
| 5,049,451 A | 9/1991 | Lal et al. ..................... 428/611 |
| 5,679,473 A | 10/1997 | Murayama et al. ....... 428/694 T |
| 5,736,262 A * | 4/1998 | Ohkijima et al. ............ 428/611 |
| 5,815,342 A | 9/1998 | Akiyama et al. ......... 360/97.01 |
| 5,981,039 A | 11/1999 | Isono et al. .................. 428/199 |
| 5,981,054 A * | 11/1999 | Hikosaka et al. ............ 428/328 |
| 6,086,974 A | 7/2000 | Thiele et al. ............... 428/65.3 |
| 6,183,893 B1 | 2/2001 | Futamoto et al. ....... 428/694 TS |
| 6,248,416 B1 | 6/2001 | Lambeth et al. ............ 428/65.3 |
| 6,416,839 B1 | 7/2002 | Xuan et al. ................. 428/65.4 |
| 6,447,936 B1 | 9/2002 | Futamoto et al. .... 428/694 TM |
| 6,524,724 B1 | 2/2003 | Cheng et al. ................ 428/611 |
| 6,589,669 B1 | 7/2003 | Uwazumi et al. ........... 428/611 |
| 6,602,620 B1 * | 8/2003 | Kikitsu et al. ........... 428/694 T |
| 6,638,648 B1 * | 10/2003 | Yamamoto et al. ......... 428/828 |

(Continued)

FOREIGN PATENT DOCUMENTS

EP    0 287280 A2    10/1988

(Continued)

OTHER PUBLICATIONS

"High Performance CoPtCrO Single Layered Perpendicular Media with No Recording Demagnetization"; Soichi Oikawa et al.; IEEE Transactions on Magnetics, vol. 36, No. 5; Sep. 2000; pp. 2393-2395.

(Continued)

*Primary Examiner*—Holly Rickman
(74) *Attorney, Agent, or Firm*—Kimms & McDowell LLP

(57) ABSTRACT

The quantity of oxide contained in a magnetic layer is controlled to control the crystal grains and the segregation structure for ensuring low noise characteristic in a granular magnetic layer of a perpendicular magnetic recording medium. The granular magnetic layer consists of ferromagnetic crystal grains and a nonmagnetic grain boundary region mainly of an oxide surrounding the ferromagnetic crystal grains. The perpendicular magnetic recording medium has a nonmagnetic underlayer composed of a metal or alloy having hexagonal closest-packed crystal structure. The ferromagnetic crystal grain is composed of an alloy containing at least cobalt and platinum. The volume proportion of the nonmagnetic grain boundary region mainly of the oxide falls within a range of 15% to 40% of the volume of the total magnetic layer.

12 Claims, 2 Drawing Sheets

U.S. PATENT DOCUMENTS

| | | | |
|---|---|---|---|
| 6,667,116 B1 | 12/2003 | Uwazumi et al. | 428/694 TS |
| 6,682,826 B1 | 1/2004 | Shimizu et al. | 428/611 |
| 6,716,543 B1 | 4/2004 | Uwazumi et al. | 428/694 TS |
| 6,794,028 B1 | 9/2004 | Uwazumi et al. | 428/366 |
| 6,884,520 B1 | 4/2005 | Oikawa et al. | |
| 2001/0012573 A1 | 8/2001 | Kaitsu et al. | |
| 2001/0027868 A1 | 10/2001 | Carisella | 166/387 |
| 2001/0038932 A1 | 11/2001 | Uwazumi et al. | |
| 2002/0018917 A1 | 2/2002 | Sakai et al. | 428/694 TM |
| 2002/0058159 A1 | 5/2002 | Kubota et al. | 428/694 TM |
| 2002/0058160 A1 | 5/2002 | Oikawa et al. | 428/694 TS |
| 2003/0049495 A1 | 3/2003 | Sakai et al. | 428/694 TM |
| 2003/0064253 A1 | 4/2003 | Uwazumi et al. | 428/694 TP |
| 2003/0152809 A1 | 8/2003 | Oikawa et al. | 428/694 |
| 2004/0027868 A1 | 2/2004 | Nakamura et al. | 365/199 |
| 2004/0043258 A1 | 3/2004 | Yamamoto et al. | 428/694 TM |

FOREIGN PATENT DOCUMENTS

| | | |
|---|---|---|
| JP | 63-201913 | 8/1988 |
| JP | 02-227814 A | 9/1990 |
| JP | 02-287918 A | 11/1990 |
| JP | 08-083418 | 3/1996 |
| JP | 8-255342 A | 10/1996 |
| JP | 11-134634 A | 5/1999 |
| JP | 2000-322726 A | 11/2000 |
| JP | 2001-283427 A | 10/2001 |
| JP | 2002-025031 A | 1/2002 |
| JP | 2003-077122 A | 3/2003 |
| JP | 2003-178412 A | 6/2003 |

OTHER PUBLICATIONS

Search and Examination Report (Austrian Patent Office) for corresponding Singapore Patent Application No. 200207316-1 dated Dec. 21, 2005; 10 pages.

Japanese Office Action dated May 12, 2006 for corresponding Japanese patent application JP 2001-374897.

Japanese Office Action dated May 2, 2006 for Japanese patent application JP 2002-009160 corresponding to related co-pending U.S. Appl. No. 10/346,838 (USPGP 2004/0027868).

US RE37,748, 06/2002, Chen et al. (withdrawn)

* cited by examiner

PERPENDICULAR MAGNETIC RECORDING MEDIUM AND METHOD OF MANUFACTURING THE SAME AND PRODUCT THEREOF

BACKGROUND

High density magnetic recording can be attained with a perpendicular magnetic recording system, as an alternative to a conventional longitudinal magnetic recording system. In this regard, a crystalline film of a CoCr alloy system has been mainly contemplated for a magnetic recording layer of a perpendicular magnetic recording medium. In perpendicular magnetic recording, the crystal orientation of the recording layer is controlled so that the c-axis of the CoCr alloy system having a hcp structure aligns perpendicular to the film surface (i.e., the c-plane is parallel to the film surface). To obtain a higher density in the CoCr alloy system, finer grain size, reduction of dispersion of grain size distribution, and decrease in magnetic interaction between grains have been contemplated.

A method of controlling the magnetic recording layer structure to raise the recording density in a longitudinal recording medium has been proposed, for example, in U.S. Pat. No. 5,679,473. A magnetic layer in this reference, generally referred to as a granular magnetic layer, has a structure in which magnetic crystal grains are surrounded by a nonmagnetic, nonmetallic substance, such as an oxide or nitride. Because the nonmagnetic and nonmetallic grain boundary phase physically separates the magnetic grains or particles in the granular magnetic film, the magnetic interaction between the magnetic particles decreases to suppress the formation of a zigzag shaped magnetic domain wall that would be formed in a transition region of a recording bit. Thus, low noise characteristic can be achieved.

In the same vein, a granular magnetic layer is contemplated for a recording layer of a perpendicular magnetic recording medium in IEEE Trans. Mag., Vol. 36, p 2393 (2000). Specifically, this publication discloses a perpendicular magnetic recording medium comprising a ruthenium metal underlayer and a magnetic recording layer of a CoPtCrO alloy having a granular structure. A magnetic film having the granular structure is formed by reactive sputtering in an oxygen-containing atmosphere using a CoPtCr target. However, since the quantity of the generated oxide is extremely sensitive to the oxygen content of the sputtering atmosphere, it is difficult to control the quantity of the oxide formation surrounding the magnetic crystal grains. Moreover, because the magnetic crystal grain is easily oxidized, separating the material composing the magnetic crystal grains and the material composing the oxide grain boundary is extremely difficult.

Accordingly, there is a need to control the quantity of oxide contained in the granular magnetic layer to control the crystal grains and the segregation structure for ensuring a low noise characteristic. There is also a need to form a superior magnetic characteristic by removing the oxide from the magnetic crystal grain. The present invention addresses these needs.

SUMMARY OF THE INVENTION

The present invention relates to a perpendicular magnetic recording medium and a manufacturing method thereof. Such a perpendicular magnetic recording medium can be mounted on various magnetic recording devices such as an external memory device of a computer.

One aspect of the present invention is a perpendicular magnetic recording medium having a nonmagnetic substrate and at least the following layers sequentially laminated on the substrate: a nonmagnetic underlayer, a magnetic layer, and a protective film. The nonmagnetic underlayer can be composed of a metal or an alloy having a hexagonal closest-packed (hcp) crystal structure. The magnetic layer can consist of ferromagnetic crystal grains and nonmagnetic grain boundary region composed mainly of an oxide surrounding the grains. The ferromagnetic crystal grain can be composed of an alloy containing at least cobalt and platinum. The volume of the nonmagnetic grain boundary region can fall within a range of 15% to 40% of the total volume of the magnetic layer. The thickness of the magnetic layer can fall within a range of 5 nm to 20 nm. Moreover, the nonmagnetic substrate can be made of a plastic resin.

Another aspect of the present invention is a method of manufacturing the perpendicular magnetic recording medium described above. The method features depositing the nonmagnetic underlayer on the nonmagnetic substrate, depositing the magnetic layer on the underlayer by RF magnetron sputtering using a composite target containing a ferromagnetic alloy and an oxide, and depositing the protective film on the magnetic layer. The depositing steps of the nonmagnetic underlayer, the magnetic layer, and the protective film can be performed without preheating the nonmagnetic substrate. The composite target can contain an oxide at a volume proportion falling within a range of 20% to 35% of the total volume of the target.

Another aspect of the present invention is a product formed by the above method.

DETAILED DESCRIPTION

The present inventors made extensive studies on the quantity of the oxide contained in the magnetic layer and finding a way of separating the oxide to the grain boundary in a perpendicular magnetic recording medium using a granular magnetic layer. The present inventors have discovered that the following structure and manufacturing method can result in a superior perpendicular magnetic recording medium by using a granular magnetic layer consisting essentially of ferromagnetic crystal grains and nonmagnetic grain boundary region mainly composed of an oxide surrounding the grains.

Figure 1:
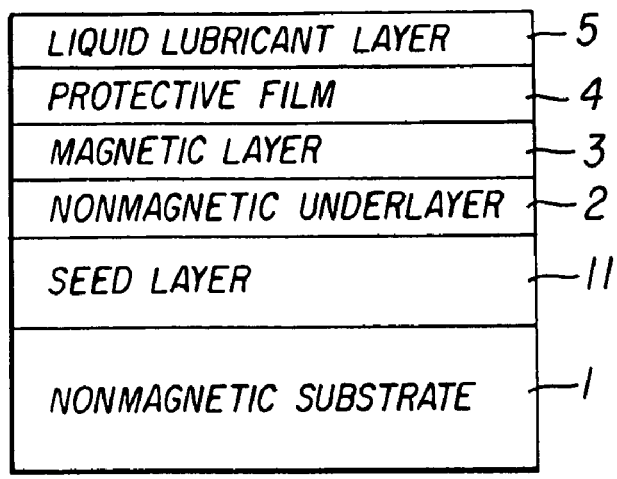
FIG. 1 is a schematic cross-sectional view illustrating a structure of an embodiment of a perpendicular magnetic recording medium according to the present invention.

FIG. 1 is a schematic cross-sectional view illustrating a structure of an embodiment of a perpendicular magnetic recording medium according to the present invention. The perpendicular magnetic recording medium comprises a nonmagnetic substrate 1 and at least the following layers sequentially laminated on the substrate: a nonmagnetic underlayer 2, a magnetic layer 3, and a protective film 4. A liquid lubricant layer 5 can formed on this laminate. A seed layer 11 can be provided between the nonmagnetic underlayer 2 and the nonmagnetic substrate 1 for the purpose of controlling the crystal alignment and grain size of the nonmagnetic underlayer 2. A relatively thick soft magnetic layer generally referred to as a backing layer (not illustrated) having a thickness of several hundred nanometers can also be provided between the nonmagnetic underlayer 2 and the nonmagnetic substrate I for the purpose of enhancing regeneration sensitivity.

The nonmagnetic substrate 1 can be made of NiP-plated aluminum alloy, strengthened glass, or crystallized glass, which are all conventionally used in a magnetic recording medium. Because substrate heating is unnecessary, the substrate also can be an injection molded polycarbonate, polyolefin, or other plastic resin.

The nonmagnetic underlayer 2 is composed of metal or alloy having a hexagonal closest-packed (hcp) crystal structure for controlling crystal orientation in the granular magnetic layer. Such materials include a metal selected from Ti, Re, Ru, and Os, and an alloy containing at least one element selected from Ti, Re, Ru, and Os. The thickness of the underlayer can be in the range of 5 nm to 30 nm.

When the seed layer 11 is provided for the purpose of controlling the crystal orientation and the grain size of the nonmagnetic underlayer 2, the seed layer can be composed of a metal or alloy having a face centered cubic (fcc) crystal structure. Such materials include a metal selected from Cu, Au, Pd, Pt, and Ir, an alloy containing at least one element selected from Cu, Au, Pd, Pt, and Ir, and an alloy containing at least Ni and Fe.

A thin film composed mainly of carbon, for example, can be used as the protective film 4. A perfluoropolyether lubricant, for example, can be used as the liquid lubricant layer 5.

The magnetic layer 3 is a so-called granular magnetic layer consisting essentially of ferromagnetic crystal grains and nonmagnetic grain boundary region surrounding the grains. The grain boundary region is composed of a metal oxide. The ferromagnetic crystal grain can be that of an alloy containing at least Co and Pt. Elements such as Cr, Ta, B, or Cu can be added to the CoPt alloy to control the magnetic characteristic and attain a low noise characteristic. The ferromagnetic crystal grain has a structure in which the c-axis of the crystal lattice is predominantly aligned perpendicular to the film surface. The volume of the nonmagnetic grain boundary region is in the range of 15% to 40% of the entire volume of the magnetic layer. When the volume is under 15%, a sufficient amount of grain boundary cannot exist between the grains, and the magnetic interaction between the grains cannot be decreased effectively. When the volume is over 40%, the crystal alignment of the grains deteriorates.

The oxide for forming the grain boundary is not limited to special materials to the extent that the oxide used is physically and chemically stable. The oxide can be an oxide of Mg, Cr, Ti, Zr, or Si.

The thickness of the magnetic layer 3 can be in the range of 5 nm to 20 nm. A thickness below 5 nm is not desirable because the magnetic layer cannot output sufficient regeneration signals. A thickness over 20 nm is also not desirable because the grain size is liable to expand and the crystal alignment is apt to become disordered.

In producing a magnetic recording medium having the above-described layer construction and illustrated in FIG. 1, the magnetic layer 3 can be formed by the following manufacturing method.

The magnetic layer is preferably deposited by means of an RF magnetron sputtering technique or method, using a composite target containing a ferromagnetic alloy and an oxide. By using this technique, separation between the crystal grain and the nonmagnetic grain boundary is promoted as compared with the case of reactive sputtering in an oxygen-containing atmosphere using a target not containing an oxide. Thus, a favorable granular structure can be obtained by the present method.

In addition, the volume of the oxide contained in the composite target is directed in the range of 20% to 35% of the volume of the entire target to control the volume of the nonmagnetic grain boundary formed in the magnetic layer within the desirable range indicated above.

In the process of manufacturing a perpendicular magnetic recording medium, even though it omits substrate heating, which is essential in a conventional magnetic recording medium, the present method still produces an excellent perpendicular magnetic recording medium. By virtue of the simplification of the production process, production costs can be reduced. Because substrate heating is unnecessary, the substrate can be made of plastic, such as polycarbonate or polyolefin.

The following describes specific examples of preferred embodiments of the present invention. These examples are presented only for an aid to appropriately explain the invention and not for restricting the invention.

In the first example, the nonmagnetic substrate 1 used was a 3.5 inch disk of injection-molded polycarbonate. After cleaning, the substrate was introduced into a sputtering apparatus. A seed layer 11 of platinum having a thickness of 5 nm was formed on the substrate 1 under argon gas pressure of 5 mTorr. Then, a nonmagnetic underlayer 2 of ruthenium having a thickness of 20 nm was formed over the seed layer 11 under argon gas pressure of 5 mTorr. Subsequently, a granular magnetic layer 3 having a thickness of 20 nm was formed by an RF magnetron sputtering technique or method using a $Co_{75}Cr_{10}Pt_{15}$ target containing various quantities of $SiO_2$ under argon gas pressure of 5 mTorr. After laminating a carbon protective film 4 having a thickness of 10 nm on the magnetic layer, the resulting medium was taken out from the vacuum chamber of the sputtering apparatus. A liquid lubricant layer 5 having a thickness of 1.5 nm was formed over the protective film 4, a magnetic recording medium having the structure as shown in FIG. 1 was produced. Substrate heating prior to the deposition of the laminating layers was not performed.

Figure 2:
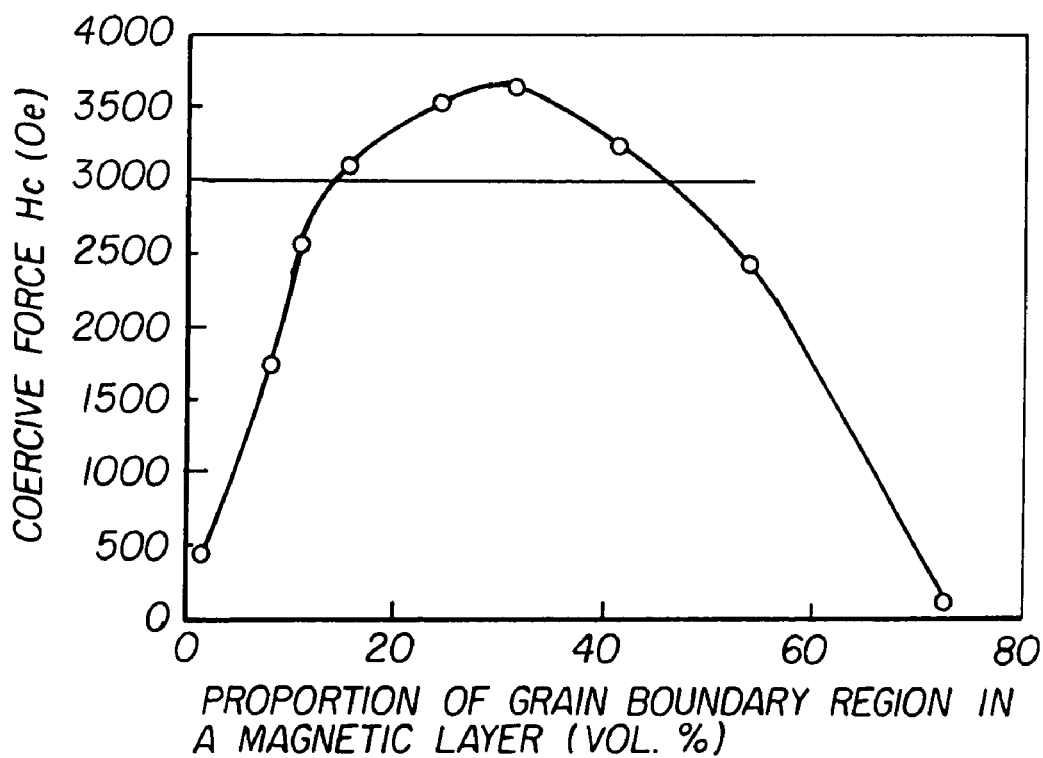
FIG. 2 is a graph showing the relationship between the coercive force Hc and the volume proportion of the nonmagnetic grain boundary region in the magnetic layer.

FIG. 2 shows the relationship between the coercive force Hc and the volume proportion of the nonmagnetic grain boundary region in the magnetic layer. The coercive force was measured by a vibrating sample magnetometer applying magnetic field perpendicular to the film surface. It can be seen that the Hc values higher than 3,000 Oe can be obtained when the volume proportion of the nonmagnetic grain boundary region in the magnetic layer is in the range of 15% to 40%.

Figure 3:
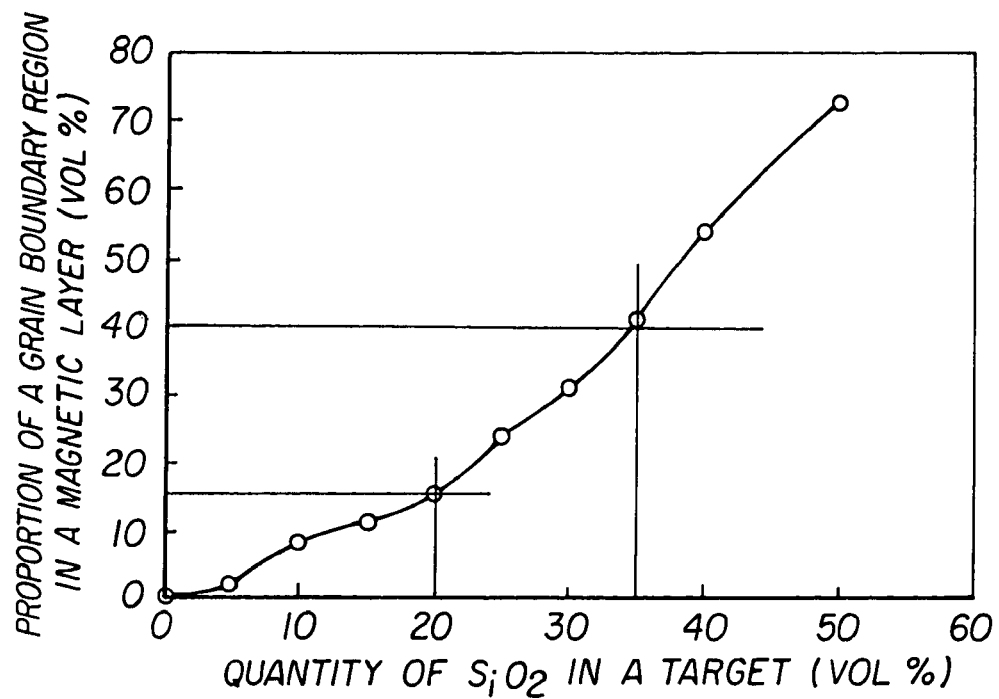
FIG. 3 is a graph showing the relationship between the volume proportion of $SiO_2$ contained in the target and the volume proportion of the nonmagnetic grain boundary region in the magnetic layer.

FIG. 3 shows the relationship between the volume proportion of $SiO_2$ contained in the target and the volume proportion of the nonmagnetic grain boundary region in the magnetic layer. The volume proportion occupied by the nonmagnetic grain boundary region in the magnetic layer was obtained by measuring the area occupied by grain boundary region and the area occupied by grains on a planar image taken by a transmission electron microscope (TEM). FIG. 3 indicates that the volume proportion of the nonmagnetic grain boundary region in the magnetic layer is in the range of 15% to 40% when the volume proportion of the SiO$_2$ in the target is in the range of 20% to 35%.

In the second example, a magnetic recording medium having a structure as shown in FIG. 1 was produced in the same manner as in the first example except that the quantity of SiO$_2$ contained in the target was fixed at 25% and the thickness of the deposited magnetic layer was varied from 3 nm to 50 nm.

Figure 4:
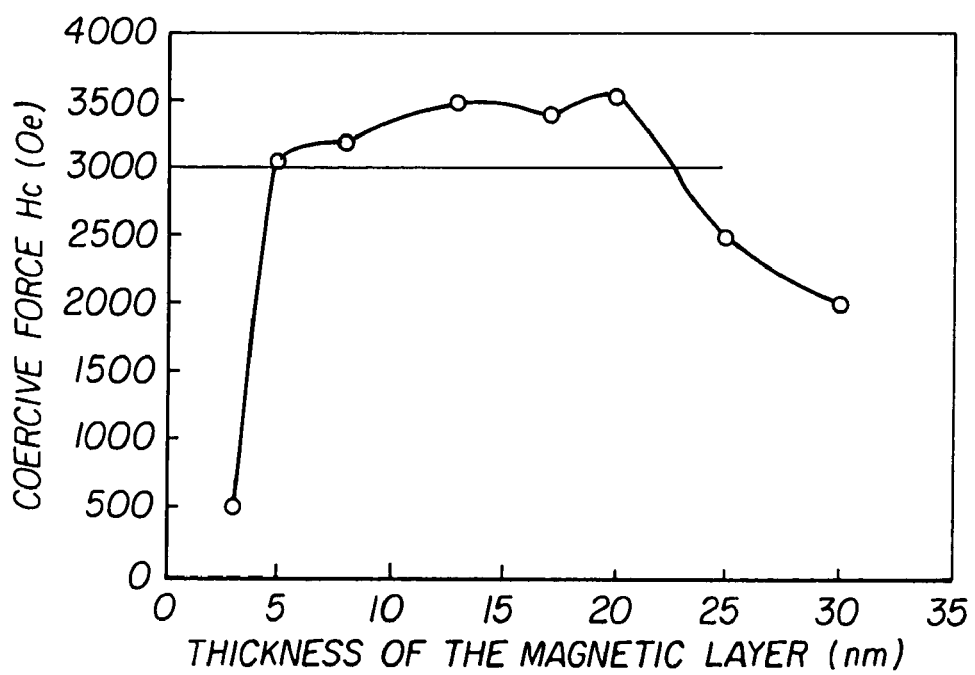
FIG. 4 is a graph showing the relationship between the Hc value and the thickness of the magnetic layer.

FIG. 4 shows the relationship between the Hc values and the thickness of the magnetic layer. Hc was measured in the same manner as described relating to FIG. 2. Hc values higher than 3,000 Oe were obtained by the magnetic layer with the thickness in the range 5 nm to 20 nm. It can be extrapolated that Hc decreases in the region thinner than 5 nm by the influence of thermal disturbance, while in the region thicker than 20 nm, Hc decreased due to the disordered crystal alignment in the grains in the magnetic layer.

A perpendicular magnetic recording medium of the present invention comprises a granular magnetic layer that is a magnetic layer consisting essentially of ferromagnetic crystal grains and a nonmagnetic grain boundary region composed mainly of an oxide surrounding the grain, and a nonmagnetic underlayer composed of a metal or alloy having a hexagonal closest-packed (hcp) crystal structure. The ferromagnetic crystal grain is composed of an alloy containing at least cobalt and platinum. By controlling the volume of the nonmagnetic grain boundary region within the range of 15% to 40% of the volume of the whole magnetic layer, the crystal grains and the grain boundary region are favorably controlled, to achieve excellent magnetic and low noise characteristics.

In addition, by controlling the thickness of the magnetic layer in the range from 5 nm to 20 nm, necessary and sufficient regeneration output can be gained; and crystal alignment is prevented from deteriorating, and the grain size is prevented from enlarging.

In a method of manufacturing a perpendicular magnetic recording medium according to the invention, a magnetic layer is deposited by an RF magnetron sputtering method using a composite target containing a ferromagnetic alloy and an oxide. By controlling the volume of the oxide contained in the target in the range of 20% to 35% of the volume of the total target, the oxide entrapped in the ferromagnetic crystal grains can be minimized and the quantity of the oxide mainly composing the grain boundary can be controlled within a preferable range.

By employing the structure of a medium and the manufacturing method as described above, an excellent perpendicular magnetic recording medium can be obtained, even without substrate heating prior to the depositing processes. As a result, simplification and cost reduction of the production process can be achieved. Further, inexpensive plastics can be used for a substrate, as well as a conventional aluminum substrate and a glass substrate.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-374897, in its entirety, including the drawings, claims, and the specification thereof, is incorporated herein by reference.

We claim:

1. A perpendicular magnetic recording medium comprising:
   a nonmagnetic substrate; and
   at least a seed layer, a nonmagnetic underlayer, a magnetic layer, and a protective film sequentially laminated on the substrate,
   wherein the seed layer is composed of a metal or alloy containing a face centered cubic (fcc) crystal structure selected from at least one element of Ni, Cu, Au, Pd, Pt, and Ir,
   wherein the nonmagnetic underlayer is composed of a metal or alloy having a hexagonal closest-packed (hcp) crystal structure,
   wherein the magnetic layer consists essentially of ferromagnetic crystal grains and a nonmagnetic grain boundary region, the nonmagnetic grain boundary region being composed of an oxide surrounding the ferromagnetic crystal grains,
   wherein the ferromagnetic crystal grains are composed of an alloy containing at least cobalt and platinum, and
   wherein a volume occupied by the grain boundary region falls within a range of 15% to 40% of a total volume of the magnetic layer, and a coercive force (Hc) thereof is greater than 3000 Oe and no higher than about 3700 Oe.

2. A perpendicular magnetic recording medium according to claim 1, wherein the magnetic layer has a thickness falling within a range of 5 nm to 20 nm.

3. A perpendicular magnetic recording medium according to claim 1, wherein the substrate is composed of a plastic resin.

4. A perpendicular magnetic recording medium according to claim 2, wherein the substrate is composed of a plastic resin.

5. A method of manufacturing a perpendicular magnetic recording medium, comprising steps of:
   depositing a seed layer is composed of a metal or alloy containing a face centered cubic (fcc) crystal structure selected from at least one element of Ni, Cu, Au, Pd, Pt, and Ir on a nonmagnetic substrate;
   depositing a nonmagnetic underlayer composed of a metal or an alloy having a hexagonal closest-packed (hcp) crystal structure on the seed layer;
   depositing a magnetic layer consisting essentially of ferromagnetic crystal grains and a nonmagnetic grain boundary region surrounding the ferromagnetic crystal grains by RF magnetron sputtering using a composite target containing a ferromagnetic alloy and an oxide on the underlayer,
   wherein the ferromagnetic crystal grains are composed of an alloy containing at least cobalt and platinum, and
   wherein a volume of the grain boundary region falls within a range of 15% to 40% of a total volume of the magnetic layer, and a coercive force (Hc) thereof is greater than 3000 Oe and no higher than about 3700 Oe; and
   depositing a protective film on the magnetic layer.

6. A method of manufacturing a perpendicular magnetic recording medium according to claim 5, wherein the depositing steps of the seed layer, the nonmagnetic underlayer, the magnetic layer, and the protective film are performed without preheating the substrate.

7. A method for manufacturing a perpendicular magnetic recording medium according to claim 6, wherein a volume occupied by the oxide contained in the composite target falls within a range of 20% to 35% of a total volume of the target.

8. A method for manufacturing a perpendicular magnetic recording medium according to claim 6, wherein a volume occupied by the oxide contained in the composite target falls within a range of 20% to 35% of a total volume of the target.

9. A perpendicular magnetic recording medium according to claim 1, wherein the oxide In the magnetic layer is $SiO_2$.

10. A method for manufacturing a perpendicular magnetic recording medium according to claim 5, wherein the oxide in the magnetic layer is $SiO_2$.

11. A method for manufacturing a perpendicular magnetic recording medium according to claim 7, wherein the oxide in the magnetic layer is $SiO_2$.

12. A method for manufacturing a perpendicular magnetic recording medium according to claim 8, wherein the oxide in the magnetic layer is $SiO_2$.

* * * * *

UNITED STATES PATENT AND TRADEMARK OFFICE
CERTIFICATE OF CORRECTION

PATENT NO.        : 7,147,942 B2                                  Page 1 of 1
APPLICATION NO.   : 10/314907
DATED             : December 12, 2006
INVENTOR(S)       : Hiroyuki Uwazumi et al.

It is certified that error appears in the above-identified patent and that said Letters Patent is hereby corrected as shown below:

Column (6), line (65) "recording medium according to claim 6, wherein a volume", is incorrect and should read as follows:

--recording medium according to claim 5, wherein a volume--

In Claim 9, Column (7), line (6) "to claim 1, wherein the oxide In the magnetic", is incorrect and should read as follows:

--to claim 1, wherein the oxide in the magnetic--

Signed and Sealed this

Sixth Day of March, 2007

JON W. DUDAS
*Director of the United States Patent and Trademark Office*